US012217623B2

(12) United States Patent
Carpenter (10) Patent No.: US 12,217,623 B2
(45) Date of Patent: Feb. 4, 2025

(54) DEMONSTRATION DEVICE FOR PHOTOCHROMIC LENSES (71) Applicant: Transitions Optical, Ltd., Tuam (IE)

(72) Inventor: William D. Carpenter, Tuam (IE)

(73) Assignee: Transitions Optical, Ltd., Tuam (IE)

( * ) Notice: Subject to any disclaimer, the term of this patent is extended or adjusted under 35 U.S.C. 154(b) by 852 days.

(21) Appl. No.: 17/427,245

(22) PCT Filed: Jan. 31, 2019

(86) PCT No.: PCT/EP2019/052336
§ 371 (c)(1),
(2) Date: Jul. 30, 2021

(87) PCT Pub. No.: WO2020/156669
PCT Pub. Date: Aug. 6, 2020

(65) Prior Publication Data
US 2022/0122485 A1   Apr. 21, 2022

(51) Int. Cl.
*G09B 23/22* (2006.01)
*G01M 11/02* (2006.01)

(52) U.S. Cl.
CPC ......... *G09B 23/22* (2013.01); *G01M 11/0285* (2013.01)

(58) Field of Classification Search
CPC .................... G09B 23/22; G01M 11/0285
See application file for complete search history.

(56) References Cited

U.S. PATENT DOCUMENTS 4,505,683 A * 3/1985 Schurle ............... G01N 17/004
434/365
6,056,421 A * 5/2000 Johnson ............... F21V 14/003
362/255

(Continued)

FOREIGN PATENT DOCUMENTS

WO   2010015990 A2   2/2010
WO   2015184190 A1   12/2015
(Continued)

OTHER PUBLICATIONS

"Photochromism", Wikipedia, Sep. 14, 2018, retrieved from Internet, https://en.wikipedia.org/w/index.php?title=Photochromism&oldid=859552610 (Retrieved Sep. 26, 2019).

*Primary Examiner* — Xuan M Thai
*Assistant Examiner* — Sadaruz Zaman
(74) *Attorney, Agent, or Firm* — The Webb Law Firm (57) ABSTRACT

A demonstration device for demonstrating at least one thermally-reversible characteristic of a photochromic optical article, such as an optical article having a photochromic material, having a housing defining an interior, and an inspection platform within the interior of the housing configured for supporting at least a portion of the optical article. The demonstration device further has at least one ultraviolet light source configured to radiate ultraviolet light into the interior of the housing, and at least one inspection light source configured to illuminate at least a portion of the interior of the housing. The demonstration device further has at least one heating device configured to heat at least a portion of the interior of the housing. The at least one heating device has at least one heat source and at least one fan.

14 Claims, 4 Drawing Sheets

(56) References Cited

U.S. PATENT DOCUMENTS

| | | | | |
|---|---|---|---|---|
| 6,712,596 | B1* | 3/2004 | Buazza | B29C 35/0288 |
| | | | | 425/808 |
| 7,688,431 | B1* | 3/2010 | Balch | G01M 11/0285 |
| | | | | 356/127 |
| 8,304,747 | B2* | 11/2012 | Kavassalis | G01K 11/12 |
| | | | | 250/474.1 |
| 8,379,195 | B2* | 2/2013 | Cado | G01M 11/02 |
| | | | | 356/124 |
| 8,497,639 | B2* | 7/2013 | Tsang | F21S 10/02 |
| | | | | 315/363 |
| 9,798,458 | B2* | 10/2017 | Dumont | G01J 1/0403 |
| 10,339,836 | B2* | 7/2019 | Nadolny | G01M 11/0285 |
| 10,369,243 | B2* | 8/2019 | Dayton | A61L 2/28 |
| 10,718,687 | B2* | 7/2020 | Koenig, II | G01M 11/0214 |
| 11,422,089 | B2* | 8/2022 | Blackburn | G01N 21/958 |
| 11,525,757 | B2* | 12/2022 | Baillet | G01N 21/00 |
| 11,885,706 | B2* | 1/2024 | Blackburn | G02C 7/04 |
| 2011/0133672 | A1* | 6/2011 | Tsang | F21S 10/02 |
| | | | | 315/294 |
| 2015/0343102 | A1* | 12/2015 | Romo | A61L 2/10 |
| | | | | 436/1 |
| 2017/0122836 | A1* | 5/2017 | Kamei | G02B 1/18 |
| 2019/0291128 | A1* | 9/2019 | Zezinka | B05B 12/14 |
| 2022/0122485 | A1* | 4/2022 | Carpenter | G09B 23/22 |
| 2024/0210273 | A1* | 6/2024 | Baldy | G09B 23/22 |

FOREIGN PATENT DOCUMENTS

| | | | |
|---|---|---|---|
| WO | 2016209236 | A1 | 12/2016 |
| WO | 2018010809 | A1 | 1/2018 |

* cited by examiner

DEMONSTRATION DEVICE FOR PHOTOCHROMIC LENSES

CROSS-REFERENCE TO RELATED APPLICATIONS

This application is the United States national phase of International Application No. PCT/EP2019/052336 filed Jan. 31, 2019, the disclosure of which is hereby incorporated by reference in its entirety.

BACKGROUND OF THE DISCLOSURE

Field of the Disclosure

The present disclosure relates generally to a demonstration device for demonstrating one or more characteristics of optical articles, and more particularly, to a demonstration device for demonstrating thermally-reversible characteristics of optical articles having a photochromic material.

Description of Related Art

With optical articles, such as lenses, the optical article may be subjected to a treatment to enhance the overall performance and function of the optical article. Examples of such treatments include the formation of one or more coatings on a surface of an optical substrate. For example, the coating could include one or more photochromic materials. Optical articles having a photochromic material are configured to transition from an unactivated, or substantially colorless state, to an activated, or colored state in response to exposure to certain wavelengths of electromagnetic radiation (or "actinic radiation"). In the absence of exposure to actinic radiation, photochromic compound(s) in such photochromic materials are reversibly transformed from the activated (colored) state, back to the unactivated (colorless) state. Generally, the reversible transformation of a photochromic compound from the unactivated (colorless) state to the activated (colored) state is faster than the transformation from the activated (colored) state to the unactivated (colorless) state.

When demonstrating the reversible transformation of photochromic lenses, such as when an optician is advising a customer, an ultraviolet light source can be used to activate the photochromic compound(s) and transform the lens from a colorless state to a colored state. This transformation occurs relatively quickly (e.g., 5 to 30 seconds) such that the transformative effect can be easily and quickly demonstrated. However, the reverse transformation from the colored state to the colorless state cannot be demonstrated as easily due to slower kinetics of switching from the activated state to the unactivated state (e.g., 2 to 7 minutes). Therefore, it would be desirable to provide a device and/or method for increasing a rate of the reverse transformation of the photochromic lens from the colored state to the colorless state.

SUMMARY OF THE DISCLOSURE

In accordance with some examples or aspects of the present disclosure, provided is a demonstration device for demonstrating at least one thermally-reversible characteristic of a photochromic optical article, such as an optical article having at least one photochromic material. The demonstration device may include a housing defining an interior, an inspection platform within the interior of the housing configured for supporting at least a portion of the optical article, at least one ultraviolet light source configured to radiate ultraviolet light into the interior of the housing, at least one inspection light source configured to illuminate at least a portion of the interior of the housing, and at least one heating device configured to heat at least a portion of the interior of the housing.

In accordance with other examples or aspects of the present disclosure, the at least one heating device may have at least one heat source and at least one fan. The at least one heat source may be an electric heating element thermally connected to a heat exchanger. The at least one heating device may be configured to maintain a temperature within the interior of the housing at a temperature in the range of 27° C. to 45° C., such as in the range of 27° C. to 37° C. In some examples or aspects of the present disclosure, the at least one heating device may be convection heating device, a conduction heating device, or a radiation heating device.

In accordance with other examples or aspects of the present disclosure, at least one control device may be operatively connected to at least one of the ultraviolet light source, the inspection light source, or the heating device. The control device may control at least one of an activation of the ultraviolet light source, an intensity of the ultraviolet light source, an activation of the inspection light source, an intensity of the inspection light source, an activation of the heating device, or a temperature of the heating device. The control device may be operatively connected to an input device configured for controlling operation of at least one of the ultraviolet light source, the inspection light source, or the heating device.

In accordance with other examples or aspects of the present disclosure, the housing may have a first portion defining the interior of the housing and a second portion receiving at least one of the ultraviolet light source, the inspection light source, or the heating device. At least a portion of the first portion of the housing may be transparent. The at least one ultraviolet light source may be movable between the first portion and the second portion of the housing. The housing may have a door for enclosing the interior of the housing.

In accordance with other examples or aspects of the present disclosure, the inspection platform may have a transparent or translucent viewing stand. The viewing stand may be movable relative to the housing. The at least one inspection light source may be configured to illuminate a side surface or a bottom surface of the viewing stand.

In accordance with other examples or aspects of the present disclosure, a method of demonstrating at least one thermally-reversible characteristic of a photochromic optical article, such as an optical article having at least one photochromic material, may include receiving the optical article within an interior of a housing of a demonstration device, irradiating at least a portion of the optical article with ultraviolet light from an ultraviolet light source to activate a photochromic compound in the photochromic material associated with the optical article, and heating at least a portion of the interior using at least one heating device to unactivate the photochromic compound. The method may further include illuminating at least a portion of the interior using an inspection light source. The method may further include controlling at least one of an activation of the ultraviolet light source, an intensity of the ultraviolet light source, an activation of the inspection light source, an intensity of the inspection light source, an activation of the heating device, or a temperature of the heating device using at least one control device.

In accordance with other examples or aspects of the present disclosure, a demonstration device for demonstrating at least one thermally-reversible characteristic of a photochromic optical article, such as an optical article having at least one photochromic material, may have a housing defining an interior and an inspection platform within the interior of the housing configured for supporting at least a portion of the optical article. The demonstration device may further have at least one ultraviolet light source configured to radiate ultraviolet light into the interior of the housing and at least one inspection light source configured to illuminate at least a portion of the interior of the housing. The demonstration device may further have at least one heating device configured to heat at least a portion of the interior of the housing. The demonstration device may further have at least one control device operatively connected to at least one of the at least one ultraviolet light source, the at least one inspection light source, or the at least one heating device. The at least one heating device may have at least one heat source and at least one fan.

The features that characterize the present disclosure are pointed out with particularity in the claims, which are annexed to and form a part of this disclosure. These and other features of the disclosure, its operating advantages, and the specific objects obtained by its use will be more fully understood from the following detailed description in which non-limiting examples of the disclosure are illustrated and described.

BRIEF DESCRIPTION OF THE DRAWINGS

In FIGS. 1-5, like characters refer to the same components and elements, as the case may be, unless otherwise stated.

DETAILED DESCRIPTION OF THE DISCLOSURE

As used herein, the singular form of "a", "an", and "the" include plural referents unless the context clearly dictates otherwise.

Spatial or directional terms, such as "left", "right", "inner", "outer", "above", "below", and the like, relate to the invention as shown in the drawing figures and are not to be considered as limiting as the invention can assume various alternative orientations.

All numbers used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

All documents referred to herein are "incorporated by reference" in their entirety.

The term "at least" is synonymous with "greater than or equal to".

As used herein, "at least one of" is synonymous with "one or more of". For example, the phrase "at least one of A, B, or C" means any one of A, B, or C, or any combination of any two or more of A, B, or C. For example, "at least one of A, B, and C" includes A alone; or B alone; or C alone; or A and B; or A and C; or B and C; or all of A, B, and C.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

As used herein, the term "optical" means pertaining to or associated with light and/or vision. For example, according to various non-limiting aspects disclosed herein, the optical element, article or device can be chosen from ophthalmic elements, articles, and devices, display elements, articles, and devices, windows, and mirrors.

As used herein, the term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein, the terms "lens" and "lenses" mean and encompass at least individual lenses, lens pairs, partially formed (or semi-finished) lenses, fully formed (or finished) lenses, and lens blanks.

As used herein, the term "photochromic" and similar terms, such as "photochromic material" or "photochromic compound", means any material or compound having an absorption spectrum for at least visible radiation that varies in response to absorption of at least actinic radiation. A photochromic material includes at least one photochromic compound. The photochromic material or compound may be incorporated into a coating or a film applied to at least one surface of an optical article. Additionally, or alternatively, the photochromic material or compound may be incorporated into the body of the optical article, such as by imbibition or casting into the material of the optical article. The term "photochromic lens" means a lens having a photochromic material associated therewith. The terms "photochromic coating" and "photochromic film" include thermally-reversible photochromic materials and compounds. The term "thermally-reversible photochromic compounds/materials" as used herein means compounds/materials capable of converting from a first state, for example a "colorless state", to a second state, for example a "colored state", in response to actinic radiation, and reverting back to the first state in response to thermal energy.

As used herein, the term "actinic radiation" means electromagnetic radiation that is capable of causing a response in a material, such as, but not limited to, transforming a photochromic material from one form or state to another as will be discussed in further detail herein.

As used herein, the terms "visible light" or "visible radiation" means electromagnetic radiation having a wavelength in the range of 380 nm to 780 nm.

As used herein, the terms "ultraviolet", "ultraviolet radiation", and "ultraviolet light" mean electromagnetic radiation having a wavelength in the range of 100 nm to less than 380 nm. The term "UV" means ultraviolet, such as ultraviolet radiation.

The discussion of various examples or aspects may describe certain features as being "particularly" or "preferably" within certain limitations (e.g., "preferably", "more preferably", or "even more preferably", within certain limitations). It is to be understood that the disclosure is not limited to these particular or preferred limitations but encompasses the entire scope of the various examples and aspects described herein.

As used herein, the terms "communication" and "communicate" may refer to the reception, receipt, transmission, transfer, provision, and/or the like, of information (e.g., data, signals, messages, instructions, commands, and/or the like).

As used herein, a "graphical user interface" or "GUI" refers to a generated display with which a user may interact, either directly or indirectly (e.g., through a button, keyboard, mouse, touchscreen etc.).

The disclosure comprises, consists of, or consists essentially of, the following examples or aspects, in any combination. Various examples or aspects of the disclosure are illustrated in separate drawing figures. However, it is to be understood that this is simply for ease of illustration and discussion. In the practice of the disclosure, one or more examples or aspects shown in one drawing figure can be combined with one or more examples or aspects shown in one or more of the other drawing figures.

With reference to FIGS. 1-5, a demonstration device 100 is shown in accordance with some examples or aspects of the present disclosure. The demonstration device 100 may be configured for demonstrating at least one thermally-reversible characteristic of a photochromic optical article, such as an optical article 200 having at least one photochromic material, as described herein. The demonstration device 100 may be configured as a portable device particularly suitable for use in an office environment. For example, the demonstration device 100 can be configured as a portable, table-top device for use in a doctor's office or an eye-care store to demonstrate thermally-reversible characteristics of photochromic optical articles 200.

The optical article 200 can be selected from ophthalmic articles or elements, display articles or elements, windows, mirrors, active liquid crystal cell articles or elements, and passive liquid crystal cell articles or elements. Examples of ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors. FIGS. 1-5 show various examples of a demonstration device 100 having various shapes. For ease of description, the demonstration device 100 shown in FIGS. 1-2B will be described in detail.

Figure 1:
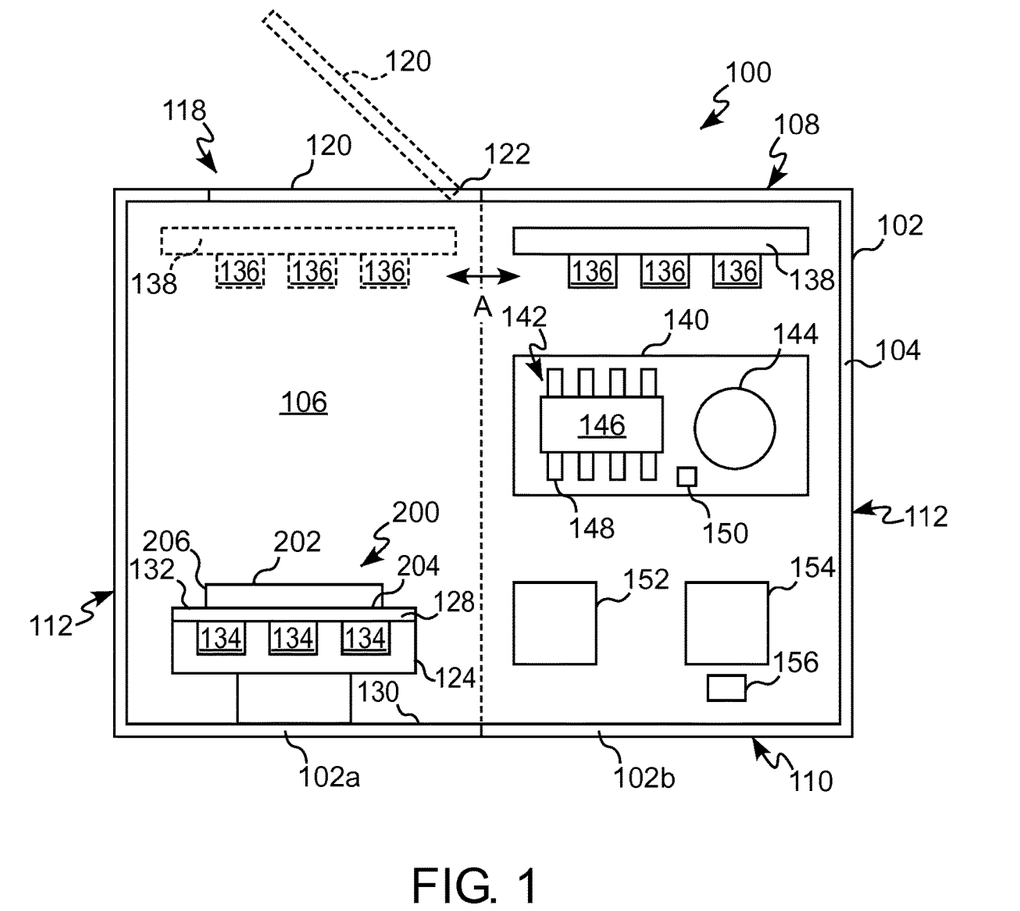
FIG. 1 is a schematic side view of a demonstration device in accordance with some examples or aspects of the present disclosure.

With reference to FIG. 1, the optical article 200 has a forward or top surface 202, a rearward or bottom surface 204, and a side surface 206 extending between the top surface 202 and the bottom surface 204. When the optical article 200 is an ophthalmic lens, the bottom surface 204 is opposed to the eye of an individual wearing the optical article 200, the side surface 206 typically resides within a supportive frame, and the top surface 202 faces incident light (not shown) at least a portion of which passes through the optical article 200 and into the individual's eye. The optical article 200 has at least one photochromic material configured to transition from an unactivated, or substantially colorless state, to an activated, or colored state in response to exposure to actinic radiation. The photochromic material may be applied to at least one surface of the optical article 200 in a coating or a film. Alternatively, or in addition, the photochromic material may be incorporated into the body of the optical article 200, such as by imbibition or prior to casting the optical article 200.

With reference to FIGS. 1-5, the demonstration device 100 includes a housing 102 having a sidewall 104 defining a hollow interior 106. The housing 102 at least partially encloses the components of the demonstration device 100. Some components of the demonstration device 100 may be completely enclosed within the housing 102, as discussed herein. The housing 102 may be of any suitable rigid material, such as plastic or metal. In some examples or aspects, at least a portion of the sidewall 104 may be transparent to allow viewing of the housing interior 106 from the outside of the housing 102 through the sidewall 104.

Figure 2A:
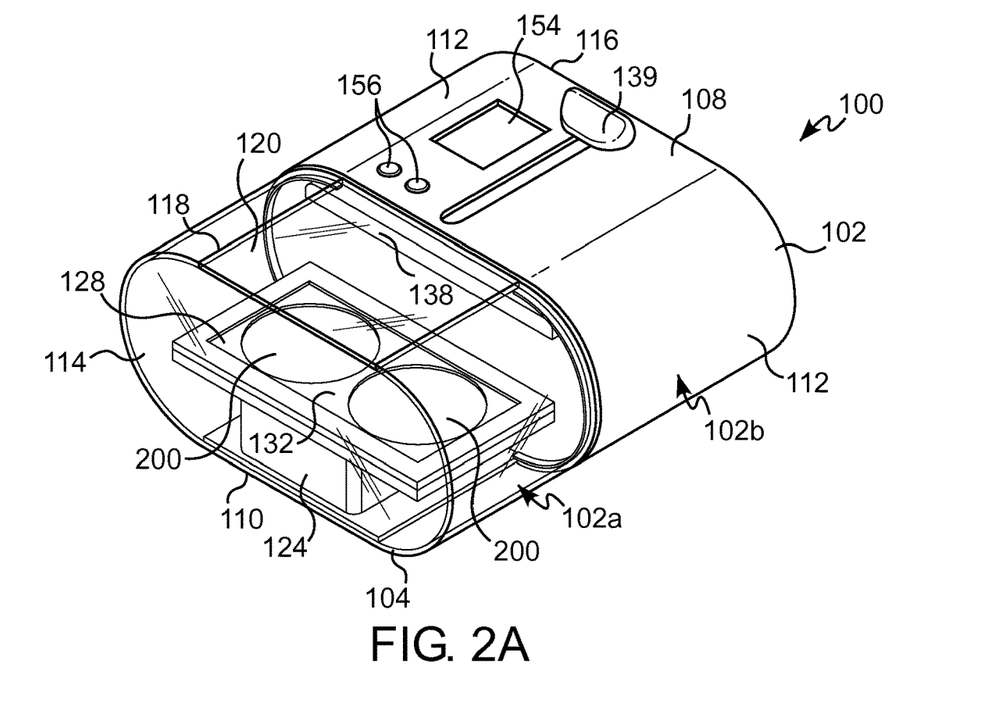
FIGS. 2A-2B are front perspective views of a demonstration device in accordance with some examples or aspects of the present disclosure.
Figure 2B:
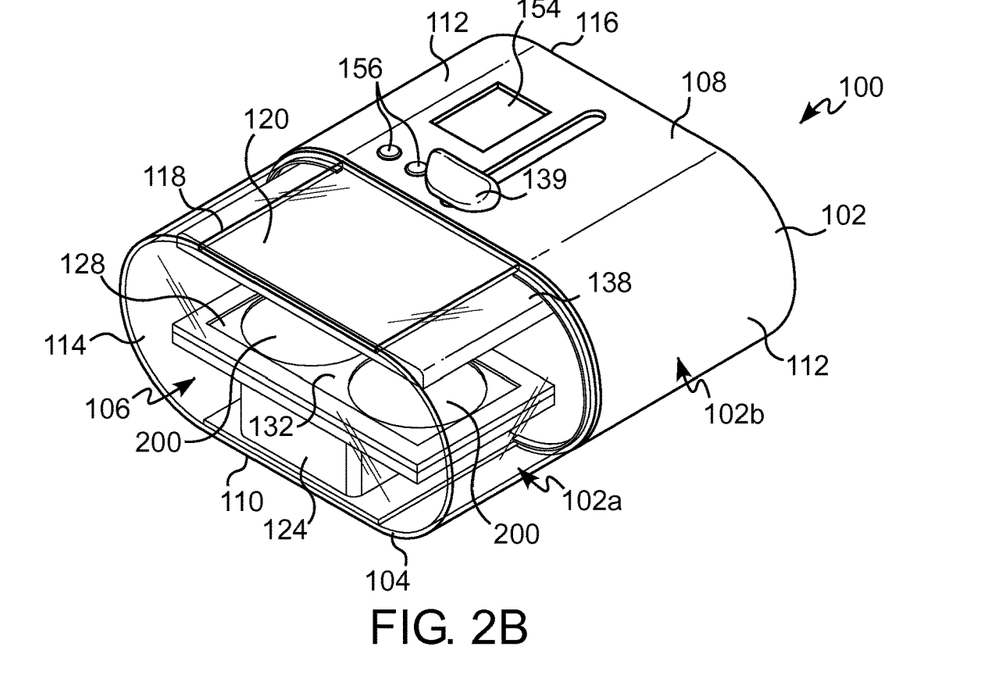
Figure 4:
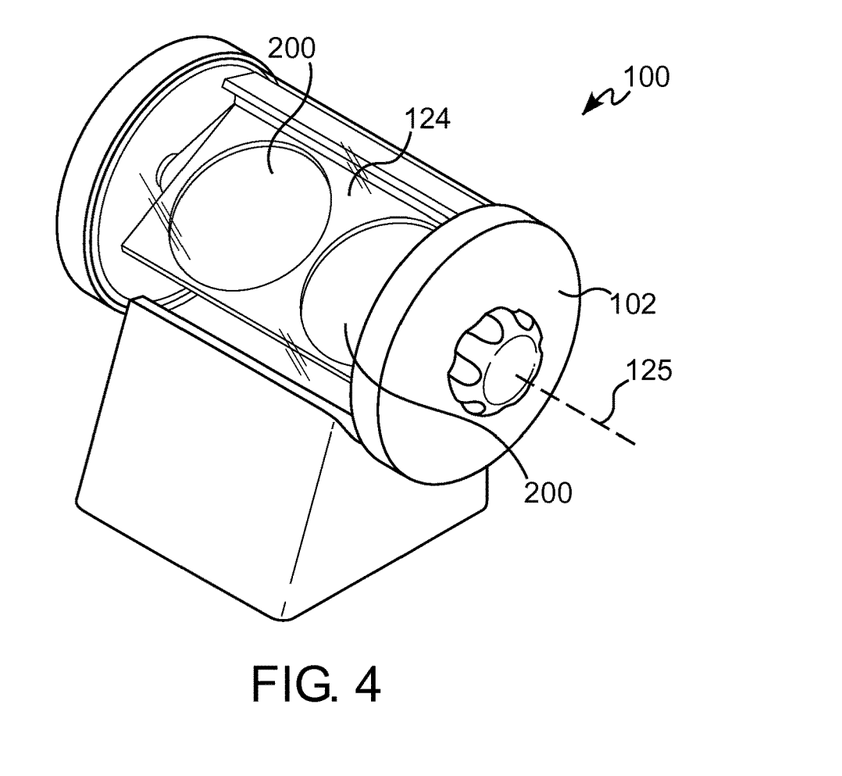
FIG. 4 is a front perspective view of a demonstration device in accordance with some examples or aspects of the present disclosure.
Figure 5:
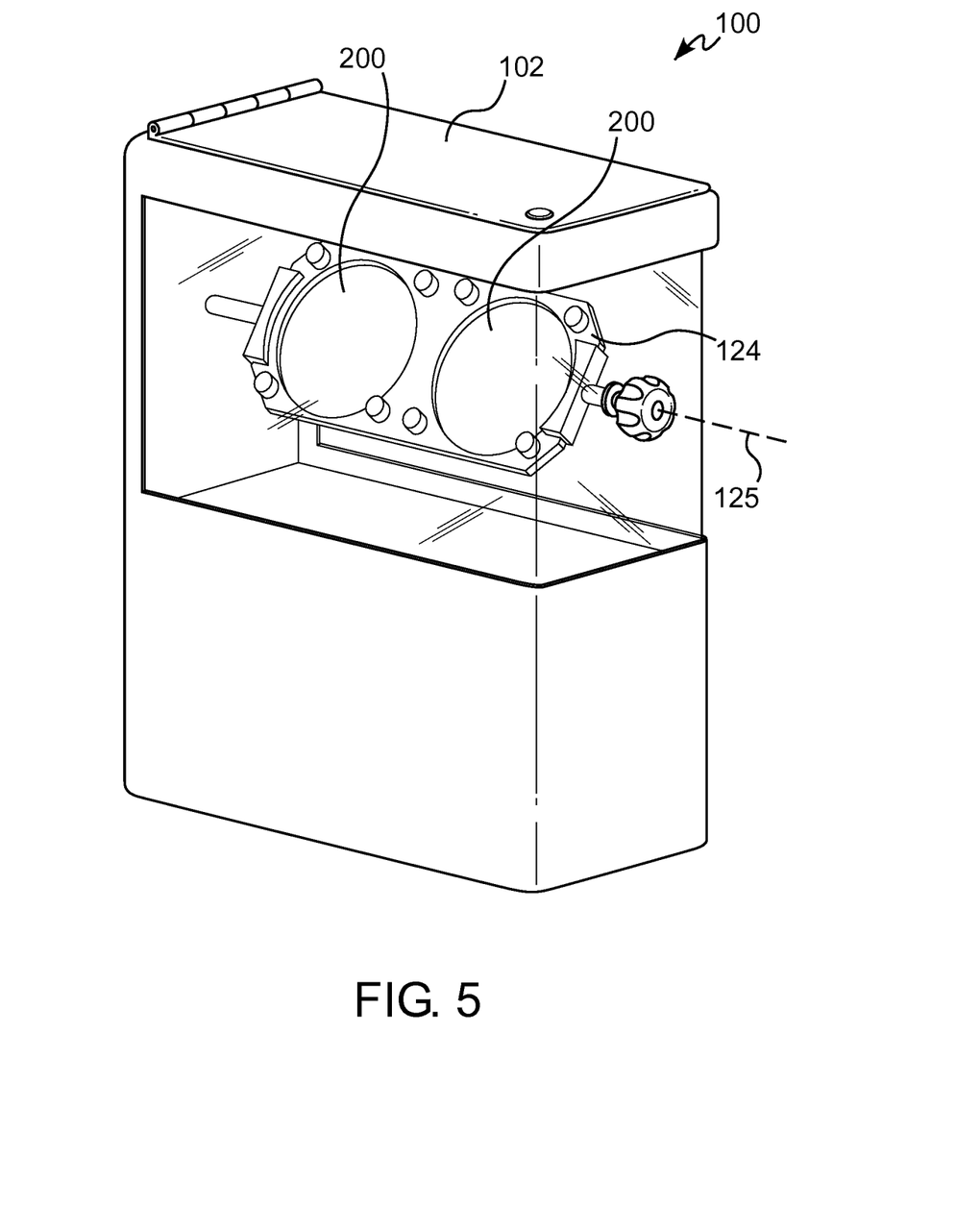
FIG. 5 is a front perspective view of a demonstration device in accordance with some examples or aspects of the present disclosure.

With continued reference to FIGS. 1-2B, the housing 102 includes a plurality of sides, including a top side 108 opposite a bottom side 110 with a pair of lateral sides 112, a front side 114 (shown in FIG. 2A), and a rear side 116 (shown in FIG. 2A) connected to each of the top side 108 and the bottom side 110. In some examples or aspects, the housing 102 is monolithically formed as a single, integral part. In other examples or aspects, the housing 102 is formed from a plurality of discrete parts that are removably or non-removably combined together. While the housing 102 shown in FIGS. 1-2B has a substantially oval cross-section in a longitudinal cross plane, the housing 102 may have any other shape. For example, with reference to FIGS. 3-4, the housing 102 may have a substantially circular cross-sectional shape. In some examples, the housing 102 may have a substantially rectangular cross-sectional shape, such as shown in FIG. 5.

With continued reference to FIGS. 1-2B, the housing 102 may have at least one opening 118 providing access to the interior 106. The opening 118 may be formed in one or more of the sides of the housing 102. The opening 118 may be enclosed by a cover panel or door 120. In some examples or aspects, the door 120 may be movable between an open position, where the opening 118 is at least partially uncovered to provide access to the interior 106, and a closed position, where the opening 118 is closed to enclose the interior 106. In some examples or aspects, the door 120 may be mounted on a hinge 122 to allow movement between the open position and the closed position. In other examples or aspects, the door 120 may be configured for sliding movement relative to one or more sides of the housing 102.

With continued reference to FIG. 1, the housing 102 may have a first portion 102*a* and a second portion 102*b*. The first and second portions 102*a*, 102*b* may be removably or non-removably connected together. In some examples or aspects, the interior 106 may be defined by one of the first portion 102*a* or the second portion 102*b*, while the other of the first portion 102 and the second portion 102*b* receives the components of the demonstration device 100 for demonstrating at least one thermally-reversible characteristic of an optical article 200 having at least one photochromic material, as discussed herein. At least one of the first portion 102*a* and the second portion 102*b* may be made from a transparent material. As used herein, "transparent" means permitting visible light to pass through without diffusing or scattering the light. The door 120 may be provided on at least one of the first portion 102*a* and the second portion 102*b*.

Figure 3:
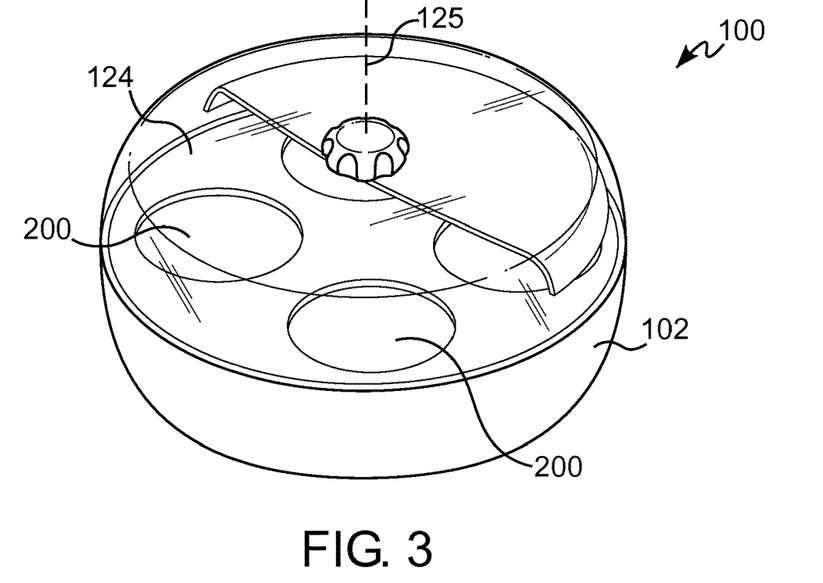
FIG. 3 is a front perspective view of a demonstration device in accordance with some examples or aspects of the present disclosure.

With continued reference to FIG. 1, the demonstration device 100 has an inspection platform 124 positioned within the interior 106 of the housing 102. The inspection platform 124 may be configured for supporting at least a portion of the optical article 200. In some examples or aspects, the inspection platform 124 may be configured for supporting a plurality of optical articles 200. For example, a pair of optical articles 200 may be positioned side-by-side on the inspection platform 124. The inspection platform 124 may be offset relative to a lower interior surface 130 of the housing 102. In some examples or aspects, the inspection platform 124 is fixed relative to the housing 102, such as shown in FIGS. 1-2B In other examples or aspects, such as shown in FIGS. 3-5, the inspection platform 124 may be movable relative to the housing 102, such as by being slidable and/or rotatable relative to the housing 102. For example, the inspection platform 124 may be rotatable relative to the housing 102 about an axis 125

The inspection platform 124 has a viewing stand 128 defining a support surface 132 for supporting at least a portion of at least one optical article 200, such as the bottom surface 204 of at least one optical article 200. The viewing stand 128 may be made from a transparent or translucent material. As used herein, "translucent" means permitting light to pass through but diffusing or scattering the light.

With reference to FIG. 1, the demonstration device 100 has at least one inspection light source 134 configured for illuminating at least a portion of the interior of the housing 102. In some examples or aspects, the at least one inspection light source 134 may be positioned between the lower interior surface 130 of the housing 102 and the viewing stand 128 such that the light emitted from at least one inspection light source 130 passes through the transparent or translucent material of the viewing stand 128 to illuminate the optical article 200. In further examples or aspects, the at least one inspection light source 134 may be placed on a side of the viewing stand 128 to illuminate the viewing stand 128 from at least one of its edges. The at least one inspection light source 134 may be configured for emitting one or more of wavelengths of visible light. In some examples or aspects, the at least one inspection light source 134 may be at least one of a fluorescent light source, a halogen light source, an incandescent light source, or an LED light source. The at least one inspection light source 134 may be one or more bulbs, lamps, LEDs, and/or light bars/strips. In some examples or aspects, the at least one inspection light source 134 may be configured for operating on a 12V DC power circuit, such as a 12V DC edge lit backlight. In other examples or aspects, the at least one inspection light source 134 may be configured for operating on a 110V or a 220V AC power circuit, and/or on battery power.

With continued reference to FIG. 1, the demonstration device 100 has at least one UV light source 136 configured to radiate ultraviolet light into the interior 106 of the housing 102. The at least one UV light source 136 may be configured for activating the photochromic compound(s) in the photochromic material of the optical article 200 due to exposure to actinic radiation emitted by the at least one UV light source 136. In some examples or aspects, the at least one UV light source 136 may be configured for emitting electromagnetic radiation within the ultraviolet spectrum, such as electromagnetic radiation having wavelength in the range of 365-415 nm. The at least one UV light source 124 may have one or more UV emitters, such as one or more conventional UV lamps and/or one or more UV light-emitting diodes (LEDs). In some examples or aspects, the at least one UV light source 124 may be a plurality of 1 W 8Type UV LEDs.

In some examples or aspects, the at least one UV light source 136 may be mounted proximate to the top side of the housing 102 such that it directs UV radiation into the interior 106 from the top side of the housing 102. In other examples or aspects, the at least one UV light source 136 may be mounted proximate to the bottom side of the housing 102 such that it directs UV radiation into the interior chamber 106 from the bottom side of the housing 102. In further examples or aspects, the at least one UV light source 136 may be mounted to top, bottom, and/or lateral sides of the housing 102. In some examples or aspects, the at least one UV light source 136 may be configured for operating on a 12V DC power circuit. In other examples or aspects, the at least one UV light source 136 may be configured for operating on a 110V or a 220V AC power circuit, and/or on battery power.

In some examples or aspects, the at least one UV light source 136 may be fixedly or non-movably mounted on the housing 102. In other examples or aspects, at least one UV light source 136 may be movable relative to the housing 102. For example, as shown in FIG. 1, the at least one UV light source 136 may be mounted to a movable frame 138 that is movable between a first position and a second position relative to the housing 102. In the first position, the movable frame 138 may be positioned such that at least one UV light source 136 may be configured to irradiate at least a portion of the inspection platform 124, while, in the second position, the movable frame 138 is moved such that at least one UV light source 136 does not irradiate the inspection platform 124. In this manner, the at least one UV light source 136 may be moved to the first position in order to activate the photochromic material of the optical article 200 supported on the inspection platform 124. Upon activation of the photochromic compound, the at least one UV light source 136 may be moved to the second position to allow for easier viewing of the optical article 200 as the photochromic material transitions from the activated state to an unactivated state. The movable frame 138 may be slidably movable relative to the housing 102 in a direction of arrow A in FIG. 1. For example, the movable frame 138 may be configured to slidably move the at least one UV light source 136 from the first portion 102*a* of the housing 102 toward the second portion 102*b*. In some examples or aspects, the movable frame 138 may be rotatably movable relative to the housing 102. The movable frame 138 may have a gripping element 139 (shown in FIGS. 2A-2B) for manually moving the frame 138 between the first and second positions. In other examples or aspects, the movable frame 138 may have a motorized mechanism for moving the frame 138 between the first and second positions via a control element, such as a button, actuating one or more electric motors.

With continued reference to FIG. 1, the demonstration device 100 has at least one heating device 140 configured to heat at least a portion of the interior 106 of the housing 102. The at least one heating device 140 is configured to increase the temperature of the optical article 200 within the interior 106 of the housing 102 relative to ambient temperature surrounding the housing 102 in order to speed up the reverse transformation process of the photochromic compound(s) in the photochromic material from the activated (colored) state back to the unactivated (colorless) state. Without intending to be bound theory, kinetics of the reverse transformation of the photochromic compound(s) from the activated to unactivated state increase with an increase in temperature.

In some examples or aspects, the at least one heating device 140 may be configured to maintain a predetermined temperature within the interior 106 of the housing 102. For example the at least one heating device 140 may be configured to maintain the interior 102 at a temperature in the range of 27° C. to 45° C., for example in the range of 27° C. to 37° C. In various examples or aspects, the at least one heating device 140 may be at least one of a conductive heating device, a convective heating device, or a radiative heating device.

With continued reference to FIG. 1, the at least one heating device 140 may have at least one heat source 142 and at least one fan 144. The at least one heat source 142 may be an electric heating element 146 thermally connected to a heat exchanger 148. The at least one fan 144 is configured to force air across the heat exchanger 148. Movement of air across the heat exchanger 148 heats the air. In some examples or aspects, the at least one heat source 142 may be a cartridge heater configured for operating on a 12V DC power circuit. The cartridge heater may have a power of 40 W. The at least one fan 144 may be a pair of fans, such as a pair of axial fans. The axial fans may have a diameter of 40 mm. In other examples or aspects, the at least one heating device 140 may be an infrared heating device, such as an infrared heating lamp.

With continued reference to FIG. 1, temperature of the heated air in the interior 106 of the housing 102 may be controlled by controlling the number and speed of the fans 144 and the number and output of the heating elements 146. A temperature control element 150, such as a thermistor, may be provided for actuating at least one of the heating elements 146 and the fans 144. In some examples or aspects, the temperature control element 150 may be a 100 Kohm thermistor.

With continued reference to FIG. 1, the demonstration device 100 has at least one control device 152 operatively connected to at least one of the UV light source 136, the inspection light source 134, or the heating device 140. In some examples or aspects, a single control device 152 may be configured to control each of the UV light source 136, the inspection light source 134, and the heating device 140. In other examples or aspects, separate control devices 152 may be provided for each of the UV light source 136, the inspection light source 134, and the heating device 140. The at least one control device 152 may be configured to control at least one of an activation of the UV light source 136 or an intensity of the UV light source 136. The control device 152 may be further configured to control at least one of an activation of the inspection light source 134 or an intensity of the inspection light source 134. The control device 152 may be further configured to control at least one of an activation of the heating device 140 or a temperature of the heating device 140. The at least one control device 152 may be configured for operating on a 12V DC power circuit. In other examples or aspects, the at least one control device 152 may be configured for operating on a 110V or a 220V AC power circuit, and/or on battery power.

In some examples or aspects, the at least one control device 152 may be a microprocessor controller, such as an Arduino Nano microprocessor controller. The at least one control device 152 may be configured for pulse width modulated (PWM) operation, wherein analog operation of at least one of the UV light source 136, the inspection light source 134, or the heating device 140 can be achieved using digital control signals. In some examples or aspects, the at least one control device 152 may be configured for continuously modulated control of at least one of the UV light source 136, the inspection light source 134, or the heating device 140. For example, the at least one control device 152 may have a proportional-integral-derivative PID controller.

With continued reference to FIG. 1, the demonstration device 100 has at least one user input device 154 configured for inputting user commands to control the operation of at least one of the UV light source 136, the inspection light source 134, or the heating device 140. The user input device 154 may include one or more devices capable of receiving information or input from the user. For example, the user input device 154 may include one or more buttons or switches 156. Alternatively or additionally, the user input device 154 may include one or more computing devices having an electronic visual display capable of displaying a graphical user interface (GUI), such as one or more monitors, touchscreens, or the like. Further, the user input device 154 may include or be in communication with one or more input devices capable of receiving input such as a touch screen display, a keyboard, a keypad, a mouse, a button, a switch, and/or the like.

In examples where the user input device 154 includes an electronic visual display, such visual display can be configured for receiving user input for controlling the operation of at least one of the UV light source 136, the inspection light source 134, or the heating device 140, and for communicating status information about an operating status or condition of the operation of at least one of the UV light source 136, the inspection light source 134, or the heating device 140. For example, the user input device 154 may be an LCD touchscreen used to input commands to control operation of at least one of the UV light source 136, the inspection light source 134, or the heating device 140. For example, the user may input commands to at least one activate/deactivate the UV light source 136, control an intensity of the UV light source 136, activate/deactivate the inspection light source 134, control an intensity of the inspection light source 134, activate/deactivate the heating device 140, or control a temperature of the heating device 140. Furthermore, the user input device 154 that is configured as an LCD touchscreen may provide information regarding the operating status or condition of at least one of the UV light source 136, the inspection light source 134, or the heating device 140. For example, the LCD touchscreen may provide information regarding an active/inactive state of the UV light source 136, an intensity of the UV light source 136, an active/inactive state of the inspection light source 134, an intensity of the inspection light source 134, an active/inactive state of the heating device 140, or a temperature of the heating device 140.

Having described the demonstration device 100 with reference to FIGS. 1-2B, an exemplary method of using the demonstration device 100 to demonstrate at least one thermally-reversible characteristic of a photochromic optical article, such as the optical article 200 with a photochromic material, will now be described.

One or more optical articles 200, such as one or more polymeric ophthalmic lenses having a photochromic material, are received within the interior 106 of the housing 102. In some examples or aspects, the one or more optical articles 200 may be received within the interior 106 of the housing 102 by moving the door 120 from the closed position to an open position in order to provide an opening for inserting the one or more optical articles 200 into the interior 106 of the housing 102. Each optical article 200 may be supported by at least one surface thereof on the inspection platform. For example, the bottom surface 204 of each optical article 200 may be supported on the support surface 132 of the viewing stand 128. After receiving the optical articles 200 within the interior 106 of the housing 102, the door 120 may be closed to enclose the housing 102. The at least one inspection light source 134 may be activated in order to illuminate the optical article 200 such that the reversible transformation of color due to activation/inactivation of the photochromic compound(s) in the photochromic material of the optical article 200 can be visually observed. Activation of the at least one inspection light source 134 may be controlled by the at least one control device 152, such as by receiving user input to activate the at least one inspection light source 134 on the user input device 154. Intensity of the at least one inspection light source 134 may be controlled by the at least one control device 152 in a similar manner.

In order to activate the photochromic compound(s) in the photochromic material of the optical article 200 (i.e, transition from colorless to colored), at least a portion of the optical article 200 having the photochromic material is irradiated with electromagnetic energy of appropriate wavelength to cause activation. Such irradiation of the optical article 200 may be performed by activating the at least one UV light source 136. Activation of the at least one UV light source 136 may be controlled by the at least one control device 152, such as by receiving user input to activate the at least one UV light source 136 on the user input device 154. For example, the user may activate the at least one UV light source 136 and set a duration of time during which the at least one UV light source 136 is to be active. For example, activation time may be between 5 seconds to 30 seconds, depending on the intensity of the at least one UV light source 136 and/or the type of photochromic compound(s) in the photochromic material of the optical article 200. Intensity of the at least one UV light source 134 may be controlled by the at least one control device 152 in a similar manner. The at least one inspection light source 134 may be active or inactive while the at least one UV light source 136 is active.

In examples or aspects where the at least one UV light source 136 is movable relative to the housing 102, the at least one UV light source 136 may be moved to the first position such that the at least one UV light source 136 is positioned to irradiate at least a portion of the optical article 200 on the inspection platform 124. In this manner, the at least one UV light source 136 activates the photochromic material on the optical article 200 supported on the inspection platform 124. Upon activation of the photochromic compound, the at least one UV light source 136 may be moved to the second position to allow for easier viewing of the optical article 200.

In order to inactivate the photochromic compound(s) in the photochromic material of the optical article 200 (i.e, transition from colored to colorless), the temperature in the interior 106 of the housing 102 is controlled to be within the predetermined range. As discussed herein, the increased temperature in the interior 106 of the housing 102 (relative to ambient temperature outside the housing 102) speeds up the reversible transition from the active (colored) state to inactive (colorless) state of the photochromic compound(s) in the photochromic material of the optical article 200. Such heating of the interior 106 of the housing 102, and thereby heating of the photochromic compound(s) in the photochromic material of the optical article 200, may be performed by activating the at least one heating device 140. Activation of the at least one at least one heating device 140 may be controlled by the at least one control device 152, such as by receiving user input to activate the at least one at least one heating device 140 on the user input device 154. For example, the user may activate the at least one at least one heating device 140 and set a duration of time during which the at least one at least one heating device 140 is to be active. Temperature of the at least one at least one heating device 140, or a desired temperature within the interior 106 of the housing 102, may be controlled by the at least one control device 152 in a similar manner. In some examples or aspects, the at least one heating device 140 may be activated after deactivating the at least one UV light source 136. In other examples or aspects, the at least one heating device 140 may be activated upon placement of the optical article 200 in the interior 106 of the housing 102. The increased temperature in the interior 106 of the housing 102 speeds up the reversible transformation of the photochromic compound(s) in the photochromic material of the optical article 200 from the active (colored) state to inactive (colorless) state.

In further examples or aspects, the demonstration device 100 can be further characterized by one or more of the following numbered clauses.

Clause 1: A demonstration device 100 for demonstrating at least one thermally-reversible characteristic of a photochromic optical article, such as an optical article 200 having at least one photochromic material, the demonstration device 100 comprising: a housing 102 defining an interior 106; an inspection platform 124 within the interior 106 of the housing 102 configured for supporting at least a portion of the optical article 200; at least one ultraviolet light source 136 configured to radiate ultraviolet light into the interior 106 of the housing 102; at least one inspection light source 134 configured to illuminate at least a portion of the interior 106 of the housing 102; and at least one heating device 140 configured to heat at least a portion of the interior 106 of the housing 102.

Clause 2. The demonstration device 100 according to claim 1, wherein the at least one heating device 140 comprises at least one heat source 142 and at least one fan 144.

Clause 3. The demonstration device 100 according to clause 2, wherein the at least one heat source 142 is an electric heating element 146 thermally connected to a heat exchanger 148.

Clause 4. The demonstration device 100 according to any of clauses 1-3, wherein the at least one heating device 140 is configured to maintain a temperature within the interior 106 of the housing 102 at a temperature in the range of 27° C. to 45° C., preferably in the range of 27° C. to 37° C.

Clause 5. The demonstration device 100 according to any of clauses 1-4, further comprising at least one control device 152 operatively connected to at least one of the ultraviolet light source 136, the inspection light source 134, or the heating device 140.

Clause 6. The demonstration device 100 according to clause 5, wherein the control device 152 controls at least one of an activation of the ultraviolet light source 136, an intensity of the ultraviolet light source 136, an activation of the inspection light source 134, an intensity of the inspection light source 134, an activation of the heating device 140, or a temperature of the heating device 140.

Clause 7. The demonstration device 100 according to any of clauses 1-6, wherein the housing 102 comprises a first portion 102a defining the interior 106 of the housing 102 and a second portion 102b receiving at least one of the ultraviolet light source 136, the inspection light source 134, or the heating device 140.

Clause 8. The demonstration device 100 according to clause 7, wherein the first portion 102a of the housing 102 is transparent.

Clause 9. The demonstration device 100 according to clause 7 or 8, wherein the at least one ultraviolet light source 136 is movable between the first portion 102a and the second portion 102b of the housing 102.

Clause 10. The demonstration device 100 according to any of clauses 1-9, wherein the housing 102 comprises a door 120 for enclosing the interior 106 of the housing 102.

Clause 11. The demonstration device 100 according to any of claims 1-10, wherein the inspection platform 124 comprises a transparent or translucent viewing stand 128.

Clause 12. The demonstration device 100 according to clause 11, wherein the at least one inspection light source 134 is configured to illuminate a side surface or a bottom surface of the viewing stand 128.

Clause 13. A method of demonstrating at least one thermally-reversible characteristic of a photochromic optical article, such as an optical article 200 having at least one photochromic material, the method comprising: receiving the optical article 200 within an interior 106 of a housing 102 of a demonstration device 100; irradiating at least a portion of the optical article 200 with ultraviolet light from an ultraviolet light source 136 to activate a photochromic compound in the photochromic material on the optical article 200; and heating at least a portion of the interior 106 using at least one heating device 140 to unactivate the photochromic compound.

Clause 14. The method of clause 13, further comprising illuminating at least a portion of the interior 106 using an inspection light source 134.

Clause 15. The method of clause 13 or clause 14, further comprising controlling at least one of an activation of the ultraviolet light source 136, an intensity of the ultraviolet light source 136, an activation of the inspection light source 134, an intensity of the inspection light source 134, an activation of the heating device 140, or a temperature of the heating device 140 using at least one control device 152.

Clause 16. A demonstration device 100 for demonstrating at least one thermally-reversible characteristic of a photochromic optical article, such as an optical article 200 having a photochromic material, the demonstration device 100 comprising: a housing 102 defining an interior 106; an inspection platform 124 within the interior 106 of the housing 102 configured for supporting at least a portion of the optical article 200; at least one ultraviolet light source 136 configured to radiate ultraviolet light into the interior 106 of the housing 102; at least one inspection light source 134 configured to illuminate at least a portion of the interior 106 of the housing 102; at least one heating device 140 configured to heat at least a portion of the interior 106 of the housing 102; and at least one control device 152 operatively connected to at least one of the at least one ultraviolet light source 136, the at least one inspection light source 134, or the at least one heating device 140, wherein the at least one heating device 140 comprises at least one heat source 142 and at least one fan 144.

Clause 17. The demonstration device 100 according to clause 16, wherein the at least one heat source 142 is an electric heating element 146 thermally connected to a heat exchanger 148.

Clause 18. The demonstration device 100 according to clause 16 or 17, wherein the at least one heat source 142 is configured to maintain a temperature within the interior 106 of the housing 102 in the range of 27° C. to 45° C., preferably in the range of 27° C. to 37° C.

Clause 19. The demonstration device 100 according to any of clauses 16-18, wherein the control device 152 controls at least one of an activation of the ultraviolet light source 136, an intensity of the ultraviolet light source 136, an activation of the inspection light source 134, an intensity of the inspection light source 134, an activation of the heating device 140, or a temperature of the heating device 140.

Clause 20. The demonstration device 100 according to any of clauses 16-19, wherein the control device 152 is operatively connected to an input device 154 configured for controlling operation of at least one of the ultraviolet light source 136, the inspection light source 134, or the heating device 140.

Clause 21. The demonstration device 100 according to any of clauses 16-20, wherein the housing 102 comprises a first portion 102a defining the interior 106 of the housing 102 and a second portion 102b receiving at least one of the ultraviolet light source 136, the inspection light source 134, or the heating device 140.

Clause 22. The demonstration device 100 according to clause 21, wherein the first portion 102a of the housing 102 is transparent.

Clause 23. The demonstration device 100 according to clause 21 or 22, wherein the at least one ultraviolet light source 136 is movable between the first portion 102a and the second portion 102b of the housing 102.

Clause 24. The demonstration device 100 according to any of clauses 16-23, wherein the housing 102 comprises a door 120 for enclosing the interior 106 of the housing 102.

Clause 25. The demonstration device 100 according to any of clauses 16-24, wherein the inspection platform 124 comprises a transparent or translucent viewing stand 128.

Clause 26. The demonstration device 100 according to clause 25, wherein the viewing stand 128 is movable relative to the housing 102.

Clause 27. The demonstration device 100 according to clause 25 or 26, wherein the at least one inspection light source 134 is configured to illuminate a side surface or a bottom surface of the viewing stand 128.

It will be readily appreciated by those skilled in the art that various modifications, as indicated above, may be made to the disclosure without departing from the concepts disclosed in the foregoing description. Accordingly, the particular examples or aspects described in detail herein are illustrative only and are not limiting to the scope of the disclosure, which is to be given the full breadth of the appended claims and any and all equivalents thereof.

What is claimed is:

1. A demonstration device for demonstrating at least one thermally-reversible characteristic of an optical article having at least one photochromic material, the demonstration device comprising:
- a housing having a sidewall defining an interior, wherein at least a portion of the sidewall is transparent to allow viewing of the housing interior from the outside of the housing through the sidewall;
- an inspection platform within the interior of the housing configured for supporting at least a portion of the optical article;
- at least one ultraviolet light source configured to radiate ultraviolet light into the interior of the housing;
- at least one inspection light source configured to illuminate at least a portion of the interior of the housing; and
- at least one heating device configured to heat at least a portion of the interior of the housing,
- wherein the at least one heating device comprises at least one heat source and at least one fan.

2. The demonstration device according to claim 1, wherein the at least one heat source is an electric heating element thermally connected to a heat exchanger.

3. The demonstration device according to claim 1, wherein the at least one heating device is configured to maintain a temperature within the interior of the housing at a temperature in the range of 27° C. to 45° C., preferably at a temperature in the range of 27° C. to 37° C.

4. The demonstration device according to claim 1, further comprising at least one control device operatively connected to at least one of the ultraviolet light source, the inspection light source, or the heating device.

5. The demonstration device according to claim 4, wherein the control device controls at least one of an activation of the ultraviolet light source, an intensity of the ultraviolet light source, an activation of the inspection light source, an intensity of the inspection light source, an activation of the heating device, or a temperature of the heating device.

6. The demonstration device according to claim 1, wherein the housing comprises a first portion defining the interior of the housing and a second portion receiving at least one of the ultraviolet light source, the inspection light source, or the heating device.

7. The demonstration device according to claim 6, wherein at least a portion of the first portion of the housing is transparent.

8. The demonstration device according to claim 6, wherein the at least one ultraviolet light source is movable between the first portion and the second portion of the housing.

9. The demonstration device according to claim 1, wherein the housing comprises a door for enclosing the interior of the housing.

10. The demonstration device according to claim 1, wherein the inspection platform comprises a transparent or translucent viewing stand.

11. The demonstration device according to claim 10, wherein the at least one inspection light source is configured to illuminate a side surface or a bottom surface of the viewing stand.

12. A method of demonstrating at least one thermally-reversible characteristic of an optical article having at least one photochromic material, the method comprising:
- receiving the optical article within an interior of a housing of a demonstration device, wherein at least a portion of a sidewall of the housing is transparent to allow viewing of the housing interior from the outside of the housing through the sidewall;
- irradiating at least a portion of the optical article with ultraviolet light from an ultraviolet light source to activate a photochromic compound in the photochromic material on the optical article; and
- heating at least a portion of the interior using at least one heating device comprising at least one heat source and at least one fan to unactivate the photochromic compound.

13. The method of claim 12, further comprising illuminating at least a portion of the interior using an inspection light source.

14. The method of claim 12, further comprising controlling at least one of an activation of the ultraviolet light source, an intensity of the ultraviolet light source, an activation of the inspection light source, an intensity of the inspection light source, an activation of the heating device, or a temperature of the heating device using at least one control device.

* * * * *